United States Patent [19]
Burton et al.

[11] Patent Number: 5,698,318
[45] Date of Patent: Dec. 16, 1997

[54] PROCESS FOR RESIN TRANSFER MOLDING AND FORMULATIONS USEFUL TO PRACTICE IT

[75] Inventors: Bruce L. Burton, Lake Jackson; Douglas L. Hunter, Angleton; Paul M. Puckett, Lake Jackson, all of Tex.

[73] Assignee: The Dow Chemical Company, Midland, Mich.

[21] Appl. No.: 449,378

[22] Filed: May 23, 1995

[51] Int. Cl.$^6$ .................. B32B 7/12; B29C 70/48
[52] U.S. Cl. .................. 428/355 EP; 428/343; 264/258; 264/324
[58] Field of Search .................. 264/135, 137, 264/258, 324; 428/343, 355, 355 EP

[56] References Cited

U.S. PATENT DOCUMENTS

| | | | |
|---|---|---|---|
| 3,312,676 | 4/1967 | Rees | 260/80.5 |
| 3,450,594 | 6/1969 | Hennessy | 428/413 |
| 3,762,863 | 10/1973 | Charle et al. | 8/127.51 |
| 3,915,635 | 10/1975 | Kalopissis et al. | 8/10.1 |
| 3,915,726 | 10/1975 | Hansen et al. | 106/122 |
| 3,922,418 | 11/1975 | Lauchenauer | 428/196 |
| 3,976,808 | 8/1976 | Honjo et al. | 427/17 |
| 4,039,331 | 8/1977 | Lee | 96/1 |
| 4,213,930 | 7/1980 | Goodrich et al. | 264/135 |
| 4,302,336 | 11/1981 | Kawaguchi et al. | 210/654 |
| 4,325,770 | 4/1982 | Korpman | 156/230 |
| 4,329,387 | 5/1982 | Goodrich et al. | 264/135 |
| 4,385,164 | 5/1983 | Sinclair et al. | 526/201 |
| 4,496,415 | 1/1985 | Sprengling | 156/283 |
| 4,594,291 | 6/1986 | Bertram et al. | 428/414 |
| 4,665,768 | 5/1987 | Scala et al. | 156/307.4 |
| 4,710,446 | 12/1987 | Hoffmann et al. | 430/281 |
| 4,892,764 | 1/1990 | Drain et al. | 628/34.5 |
| 4,992,228 | 2/1991 | Heck et al. | 264/135 |
| 5,080,851 | 1/1992 | Flonc et al. | 264/156 |
| 5,089,579 | 2/1992 | Sutter et al. | 526/323.2 |
| 5,134,239 | 7/1992 | Bertram et al. | 546/112 |
| 5,176,949 | 1/1993 | Allagnat et al. | 428/198 |
| 5,204,033 | 4/1993 | Pearce et al. | 264/136 |
| 5,204,042 | 4/1993 | James et al. | 264/257 |
| 5,212,010 | 5/1993 | Curzio et al. | 428/260 |
| 5,217,766 | 6/1993 | Flonc et al. | 428/156 |
| 5,240,661 | 8/1993 | Parker et al. | 264/103 |
| 5,369,192 | 11/1994 | Ko et al. | 525/484 |
| 5,427,725 | 6/1995 | White et al. | 264/137 |
| 5,427,726 | 6/1995 | White et al. | 264/137 |
| 5,432,010 | 7/1995 | Ko et al. | 428/542.8 |

FOREIGN PATENT DOCUMENTS

| | | | |
|---|---|---|---|
| 53-143665 | 12/1978 | Japan | B29D 3/02 |
| 56-163173 | 12/1981 | Japan | C09J 3/14 |
| 59-008374 | 2/1984 | Japan | C09J 3/14 |
| 2158471A | 11/1985 | United Kingdom | A42B 3/00 |

OTHER PUBLICATIONS

Hwa et al., *Acrylic Anhydrides and Polymers Derived Therefrom*, Journal of Polymer Science: Part A, vol. 2, pp. 2385–2400.

*Primary Examiner*—Daniel Zirker

[57] ABSTRACT

An improved tackifier for making tackified substrates contains: (a) at least one epoxy resin, and (b) at least one curing agent for the epoxy resin, but (c) no catalytic amount of catalyst for the reaction between the epoxy resin and the curing agent. The tackified substrates are used to make composites by: (1) placing one or more of the tackified substrates in a mold; (2) injecting into the mold a matrix resin formulation which is chemically-similar to the tackifier, except that it contains a catalytic amount of catalyst for the reaction between the epoxy resin and the curing agent; and (3) curing the matrix resin formulation. The tackifiers are more storage-stable than similar tackifiers which contain catalyst, and the resulting composites have and/or retain physical properties better than composites made using tackifiers without curing agent.

6 Claims, No Drawings

PROCESS FOR RESIN TRANSFER MOLDING AND FORMULATIONS USEFUL TO PRACTICE IT

BACKGROUND OF THE INVENTION

The present invention relates to resin transfer molding processes and preforms useful in those processes.

Resin transfer molding processes are used to make fiber reinforced composite materials. Layers of reinforcing material are loaded into a mold, and a thermosetting resin is injected into the mold and cured by ordinary and accepted procedures to provide a finished composite piece.

It is difficult and time consuming to load different layers of fiber into the mold. It was previously necessary to stitch the fibers together in order to provide net-shaped preforms.

More recently, a thermoplastic-like resin is sometimes used as a "tackifier" to stiffen the reinforcing material and hold it in place before the molding process begins. See Heck et al., U.S. Pat. No. 4,992,228 (Feb. 12, 1991) and Flonc et al., U.S. Pat. No. 5,080,851 (Jan. 14, 1992), which are incorporated herein by reference. ("Thermoplastic-like" means that the resin is a solid, the thermosetting resin that exhibits thermoplastic properties, such as a glass-transition temperature and/or a melting point, below the temperature that cures the resin, so that the resin is thermoformable.) In such a process, the individual fiber plies are sprinkled with a solid powder of the tackifier. The powder is heated to fuse it onto the surface of the substrate and then cooled to solidify it. The different plies can be stacked together, heated to fuse the plies together, and then cooled leaving a preform. The preform can be placed into the mold and used in an ordinary resin transfer molding process thereafter.

SUMMARY OF THE INVENTION

It has been recognized that chemical differences between the tackifier and the matrix resin may harm the physical properties of the composite. Therefore, it has been recommended to use a tackifier which is almost identical to the matrix resin. See PCT Publication WO94-26493 (Nov. 24, 1994), which is incorporated herein by reference. However, such tackifiers may not be stable enough for long-term storage of the tackified substrate. What is needed is a material which is more stable for long-term storage, but cures to form a product which is essentially identical to the cured matrix resin.

One aspect of the present invention is a tackified substrate comprising:

(1) a fiberous substrate suitable for use in a matrix composite; and
(2) about 0.25 to 15 weight percent of a tackifier containing:
 (a) an epoxy resin, and
 (b) a curing agent for the epoxy resin, but
 (c) no catalytic amount of catalyst for the reaction between the epoxy resin and the curing agent.

A second aspect of the present invention is a process to use the tackified substrate comprising the steps of:

(1) placing one or more of the tackified substrates, individually or as a preform, in a mold;
(2) injecting into the mold a matrix resin formulation which contains:
 (a) an epoxy resin,
 (b) a curing agent for the epoxy resin, and
 (c) a catalytic amount of catalyst for the reaction between the epoxy resin and the curing agent; and
(3) curing the matrix resin formulation.

A third aspect of the present invention is a formulation which is particularly useful as a tackifier in the preforms of the present invention and is useful as a matrix resin formulation in the process of the present invention. The formulation comprises:

(1) about 30 to 50 weight percent epoxy resin derived from a phenol-hydrocarbon resin;
(2) about 20 to 30 weight percent diglycidyl ether of a halogenated dihydric phenol;
(3) about 20 to 40 weight percent polyhydric phenol or phenolic resin;
(4) optionally, up to about 15 weight percent liquid epoxy resin; and
(5) optionally, a catalytic amount of a catalyst for the reaction of the epoxy resins with the polyphenol resin.

When the formulation is used as a tackifier, it preferably does not contain Components (4) and (5). When the formulation is used as a matrix resin formulation, it preferably contains Components (4) and (5).

The tackifier of the present invention is useful to make tackified substrates of the present invention. The tackified substrates, matrix resin formulation and process of the present invention are useful to make matrix composites. In addition, the tackifier and matrix resin formulation of the present invention may be useful for other purposes, and the tackified substrates and process may be practiced using different tackifiers and matrix resin formulations.

DETAILED DESCRIPTION OF THE INVENTION

The present invention uses a reinforcing substrate. Suitable reinforcements are well known and familiar to persons of ordinary skill in the art. See, E. G. Kirk-Othmer, *Encyclopedia of Chemical Technology-Supplement*, "Composites, High Performance," at 260–281 (J. Wiley & Sons, 1984), which is incorporated herein by reference. The substrate usually contains fibers, such as quartz, aramid, boron, glass, carbon, or gel-spun polyethylene fibers. The fibers can be unidirectional or multidirectional. They may be in the form of woven or non-woven mats or in the form of random short fibers. Preferably, the substrate is in the form of a woven or non-woven fibrous material.

The substrate is contacted with tackifier under conditions such that the tackifier partially adheres to the fibers. The tackifier should be a solid or a glassy solid up to temperatures of at least about 40° C. It preferably becomes flowable and tacky at a temperature of at least about 40° C., more preferably up to at least about 50° C., and most preferably up to at least about 60° C. It is preferably an injectable liquid at a temperature of less than 200° C., more preferably at a temperature of less than 175° C., and most preferably at a temperature of less than 150° C. (The same temperature criteria are preferably met individually by each component in the tackifier.)

The tackifier contains: (a) at least one epoxy resin, and (b) at least one curing agent which is capable of reacting with the epoxy resin, but (c) no catalytic amount of catalyst for the reaction between the epoxy resin and the curing agent.

The epoxy resins are preferably poly(glycidyl ethers) of one or more polyhydric phenols, such as biphenols, bisphenols (such as bisphenol A or bisphenol F), novolac resins, phenol-hydrocarbon resins, and halogenated variations of those resins. A more preferred epoxy resin mixture contains a mixture of:

(1) a poly(glycidyl ether) of a phenol-hydrocarbon resin, and (2) a diglycidyl ether of a halogenated bisphenol.

Examples of phenol-hydrocarbon resins, their glycidyl ethers, and processes to make them are described in Nelson et al., U.S. Pat. No. 4,390,680 (Jun. 28, 1983); Nelson, U.S. Pat. No. 4,394,497 (Jul. 19, 1983); and Bogan et al., U.S. Pat. No. 4,710,429 (Dec. 1, 1987), which are incorporated herein by reference. The phenol-hydrocarbon resin is highly preferably a condensation product of dicyclopentadiene and phenol, such as is represented in Formula I:

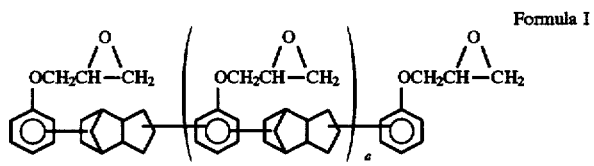

Formula I wherein "a" represents an average number of repeating units which is preferably 0 to 10, more preferably 0 to 5 and most preferably 0 to 2. The epoxy-equivalent weight (EEW) of the phenol-hydrocarbon resin is preferably between about 175 and about 400, and more preferably between about 200 and about 260.

The diglycidyl ether of a halogenated bisphenol is preferably a diglycidyl ether of a brominated bisphenol, more preferably a diglycidyl ether of brominated bisphenol A, and most preferably a diglycidyl ether of tetrabromobisphenol A.

The curing agent is preferably selected such that it will not substantially cure with the epoxy resin at ambient temperatures without a catalyst. Examples of preferred curing agents include: polyhydric phenols and/or phenolic resins, carboxylic acids, carboxylic acid anhydrides or mixtures thereof.

Polyhydric phenols and/or phenolic resins which are useful as curing agents preferably contain on average more than 2 phenolic hydroxyl groups per molecule and more preferably at least about 3 phenolic hydroxyl groups per molecule. The maximum number of phenolic hydroxyl groups is not critical, but is limited by practical considerations, such as viscosity and glass-transition temperature. In most cases, the polyhydric phenol or phenolic resin preferably contains on average no more than about 12 phenolic hydroxyl groups per molecule, and more preferably contains on average no more than about 8 phenolic hydroxyl groups per molecule. The polyphenol is preferably a novolac resin, and more preferably a cresol-novolac resin.

The tackifier may optionally contain other, non-catalytic components. For instance, the tackifier may contain thermoplastic polymers, rubbers or elastomers or other modifiers.

The tackifier should not contain a catalytic amount of any catalyst for the reaction between the curing agent and the epoxy resin. Examples of catalysts include: amines and ammonium compounds, phosphine and phosphonium compounds, aliphatic sulfonium and arsonium compounds, and heterocyclic nitrogen-containing compounds. More specific examples of catalysts are described in: Bertram et al., U.S. Pat. No. 4,594,291 (Jun. 10, 1986) (Col. 8 line 59 to Col. 9, line 11); and Bertram et al., U.S. Pat. No. 5,134,239 (Jul. 28, 1992) (Col. 2, line 15 to Col. 23, line 29), which are incorporated herein by reference. The tackifier preferably contains less than 0.05 weight percent catalyst, more preferably less than 0.01 weight percent catalysts, and most preferably about 0 weight percent catalyst.

The epoxy resins, curing agents and other components are blended to make the tackifier. They are preferably melt-blended, cooled to solidify the melt, and then ground to a powder. The average particle diameter of the tackifier is preferably no more than about 150 µm, more preferably no more than about 100 µm, and most preferably no more than about 75 µm. The minimum average particle diameter is not critical, and is limited by practical considerations, such as handling and application. In most cases, the average particle diameter is preferably at least about 45 µm and more preferably at least about 50 µm. It is theorized (without intending to be bound) that in the curing step, the catalyst in the matrix resin formulation can initiate curing reactions at the surface of the particle, which continue into the center of the particle. Therefore, it is advantageous to use a small particle size.

The tackifier should be applied to the substrate in a quantity great enough to hold the fibers in the desired shape and position but small enough to leave the resulting preform porous, so that later the matrix resin formulation can infuse throughout the substrate. The quantity of tackifier is preferably at least about 0.25 weight percent of the substrate, more preferably at least about 1 weight percent, and most preferably at least about 3 weight percent. The quantity of tackifier is preferably no more than about 15 weight percent of the substrate, more preferably no more than about 8 weight percent, and most preferably no more that about 5 weight percent.

The tackifier may be applied by known methods for powders, such as by sprinkling or electrostatic application. It is preferably applied substantially evenly across the substrate. The tackifier is heated above its glass-transition temperature to cause it to adhere to the fibers and to adhere the fibers together. This step may be carried out either when the tackifier is applied or afterward. The temperature is preferably low enough that the tackifier does not cure substantially. The temperature is preferably between 40° C. and 150° C., and more preferably between 80° C. and 110° C.

Individual plies of tackified substrate are preferably shaped and/or laminated together to make a preform after the tackifier is applied and before the composite is made. For instance, multiple plies may be pressed together at a temperature above the glass transition temperature of the tackifier. Likewise, individual plies or laminated preforms may be molded or shaped at a temperature that is above the glass transition temperature of the tackifier and that does not fully cure the tackifier. The temperature is preferably as previously described for adhering the tackifier. Examples of shaping and laminating different preforms are described in Heck, U.S. Pat. No. 4,992,228 (Feb. 12, 1991) and Flonc, U.S. Pat. No. 5,080,851 (Jan. 14, 1992), which are incorporated herein by reference.

The preforms are used for resin transfer molding by: (1) loading the preform into a mold; (2) injecting a matrix resin formulation into the mold; and (3) curing the matrix resin formulation. (Theoretically, the tackifier cures simultaneously with the matrix resin, although direct observation to verify simultaneous curing is difficult.) The matrix resin formulation contains at least one epoxy resin and at least one curing agent. The description and preferred embodiments of the epoxy resin and curing agent are the same as previously described for the tackifier. However, the matrix resin formulation optionally contains some resins of lower molecular weight which reduces the melt viscosity of the formulation. Moreover, the matrix resin formulation should contain a catalytic amount of a catalyst for the reaction between the epoxy resin and the curing agent.

The epoxy resin(s) and curing agent(s) in the matrix resin formulation are preferably essentially identical to the epoxy resin(s) and curing agent(s) in the tackifier, so that the tackifier and matrix resin formulation cure to provide essentially equivalent cured polymers. For instance, the epoxy resin and curing agent components of the tackifier and the matrix resin formulation:

(a) preferably contain essentially the same reactive sites on the curing agent;
(b) preferably have in common at least about 50 percent of backbone units that link the reactive sites, more preferably at least about 80 or 90 percent, and most preferably essentially all;
(c) preferably have weight average molecular weights that differ from each other by no more than about a 5:1 ratio, more preferably no more than about a 3:1 ratio and most preferably no more than about a 2:1 ratio;
(d) preferably have average equivalent weights that differ from each other by no more than about a 5:1 ratio, more preferably no more than about a 3:1 ratio, more highly preferably no more than about a 2:1 ratio, and most preferably by no more than a 1.5:1 ratio; and
(e) preferably differ by no more than 50 percent, more preferably no more than about 25 percent, and most preferably no more than about 10 percent, in their concentration in the formulation.

Suitable catalysts for the matrix resin formulation have already been described and are well known in the art. The catalyst is preferably an amine, a phosphonium salt or an imidazole. It more preferably contains a 2-alkylimidazole, a tetraalkylphosphonium salt, or an alkyl tritolylphosphonium salt. The concentration of catalyst is preferably at least about 0.05 weight percent and more preferably at least about 0.1 weight percent. The maximum concentration of catalyst is not critical and is limited primarily by practical considerations, such as cost, cure time and properties of the cured resin. In most cases, the concentration of catalyst is preferably no more than about 5 weight percent and more preferably no more than about 2 weight percent.

The quantity of matrix resin formulation should be sufficient to hold the fibers together, to maintain fiber alignment and, preferably, to transfer loads around broken fibers. It is usually preferable to minimize the quantity of matrix resin formulation in the composite. After curing, the matrix resin formulation and tackifier preferably make up at least about 25 volume percent of the composite and more preferably make up at least about 35 volume percent. The matrix resin formulation and tackifier are preferably no more than about 75 volume percent of the composite, more preferably no more than about 45 volume percent and most preferably no more than about 40 volume percent.

The matrix resin formulation is preferably applied under sufficient pressure to force it throughout the preform, so that the preform is impregnated with resin and voids within the cured composite are minimized. The matrix resin formulation is preferably applied at pressures from a vacuum to 600 psig. There is frequently a pressure drop across the mold, so that pressure at the inlet may be as high as about 400 psig while pressure at the outlet is 50 psig or lower. The cured composite preferably contains no more than about 5 volume percent voids, more preferably no more than about 2 volume percent, and most preferably no more than about 1 volume percent voids.

The matrix resin formulation and tackifier are then subjected to temperature and other conditions suitable to fully cure them. Again, the optimum time and temperature varies widely depending upon the matrix resin formulation and tackifier used, and will be familiar to persons skilled in the art. The final curing step is preferably about 30 to 120 minutes at a temperature of about 90° C. to 180° C. However, for some matrix formulations the best curing temperature may be as high as 250° C. or more. The final curing step is preferably completed in a mold that can provide a composite of the desired shape.

The resulting cured composite can be cooled, finished and used in the ordinary manner for matrix composites.

A preferred resin formulation for use in tackifiers and matrix resins contains:

(1) about 30 to 50 weight percent epoxy resin derived from a phenol-hydrocarbon resin;
(2) about 20 to 30 weight percent diglycidyl ether of a halogenated dihydric phenol;
(3) about 20 to 40 weight percent polyphenol resin;
(4) optionally, up to about 15 weight percent liquid epoxy resin; and
(5) optionally, a catalytic amount of a catalyst for the reaction of the epoxy resins with the polyphenol resin.

The formulation more preferably contains:

(1) about 35 to 45 weight percent epoxy resin derived from a phenol-hydrocarbon resin;
(2) about 25 to 30 weight percent diglycidyl ether of a halogenated dihydric phenol;
(3) about 25 to 35 weight percent polyphenol resin;
(4) optionally, up to about 10 weight percent liquid epoxy resin; and
(5) optionally, a catalytic amount of a catalyst for the reaction of the epoxy resins with the polyphenol resin.

The formulation most preferably contains:

(1) about 40 to 43 weight percent epoxy resin derived from a phenol-hydrocarbon resin;
(2) about 25 to 30 weight percent diglycidyl ether of a halogenated dihydric phenol;
(3) about 27 to 33 weight percent polyphenol resin;
(4) optionally, about 1–4 weight percent liquid epoxy resin; and
(5) optionally, a catalytic amount of a catalyst for the reaction of the epoxy resins with the polyphenol resin.

The formulation may further contain organic solvent when it is used as a matrix resin formulation, but it preferably does not. The solids concentration is preferably at least about 50 weight percent, more preferably at least about 75 weight percent, and most preferably at least about 99 weight percent. When the formulation is used as a tackifier, element (4) is preferably not used and element (5) should not be used. When the formulation is used as a matrix resin, element (4) is preferably used, and element (5) should be used.

The process of the present invention is more fully illustrated in the following examples.

SPECIFIC EXAMPLES

The following examples are for illustrative purposes only and they should not be taken as limiting the scope of either the specification or the claims. Unless otherwise stated all parts and percentages are by weight.

The following materials are used in the examples:

Epoxy Resin A—is a diglycidyl ether of tetrabromobisphenol having an epoxide equivalent weight (EEW) of about 305 to 355, that is commercially available from The Dow Chemical Company as D.E.R.* 542 epoxy resin.

Epoxy Resin B—is the polyglycidyl ether of a dicyclopentadiene-phenol oligomer. Epoxy Resin B contains on average about 3.2 epoxy groups per molecule and has an EEW of about 255.

Epoxy Resin C—is the polyglycidyl ether of a dicyclopentadiene-phenol oligomer. Epoxy Resin C contains on average about 2.2 epoxy groups per molecule and has an EEW of about 215 to 235. It is commercially available from The Dow Chemical Company as TACTIX* 556 epoxy resin.

Epoxy Resin D—is liquid diglycidyl ether of bisphenol A having an EEW of about 172 to 176.

Novolac Resin E—is a cresol novolac resin containing about 6 phenolic hydroxyl groups per molecule which is commercially available from Schenectady Chemicals, Inc as CRJ-406.

Catalyst F—is a product obtained by mixing tetrabutylphosphonium acetate-acetic acid complex and fluoboric acid.

EXAMPLE 1

Process Using Mixture of Phenol-Hydrocarbon Epoxy Resin and Halogenated Epoxy Resin A tackifier is made by the following procedure. A 5663 g quantity of Epoxy Resin A and a 3215.5 g quantity of Epoxy Resin B are melted separately at 150° C. Both resins are mixed in a reactor at 145° C. An additional 7014.5 g of Resin B flakes are added to the molten mixture, and 6770 g of Novolac E flakes are added. The mixture is stirred for 50 minutes, and then drained onto foil and cooled to room temperature to solidify. The solid mixture is broken, ground and seived to an average particle diameter of no more than about 106 μm.

A tackified cloth is made by sprinkling the tackifier on carbon cloth, heating the tackifier to 200° F. to melt it, and then cooling the tackifier. The cloth contains about 4 weight percent tackifier at the end of the procedure.

A preform is made using 8 plies of tackified cloth. The plies are stacked in a vacuum bag apparatus and a vacuum is pulled to put about 1 atm. pressure on the stack of plies. The plies are then heated to 200° F. and cooled to room temperature to make a preform.

A composite is made using the preform. The preform is placed into a matched die mold, which is sealed and placed under vacuum. A matrix resin formulation is injected into the mold. The formulation contains: about 26 weight percent Epoxy Resin A, about 42 weight percent Epoxy resin C, about 3 weight percent Epoxy Resin D, about 30 weight percent Novolac Resin E, and about 1 weight percent Catalyst F. The panel is cured for three hours at 177° C. The product is a composite panel.

What is claimed is:

1. A tackified substrate comprising:
   (1) a fibrous substrate suitable for use in a matrix composite; and
   (2) about 0.25 to 15 weight percent of a tackifier containing:
      (a) a phenol-hydrocarbon resin glycidyl derivative represented by the formula:

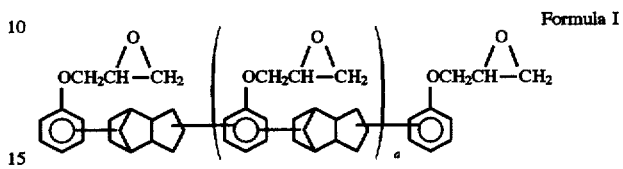

Formula I wherein "a" represents an average number of repeating units which is 0 to 10

(b) at least one curing agent containing at least one compound selected from the group consisting of a polyhydric phenol or phenolic resin, a carboxylic acid or a carboxylic acid anhydride, and
   (c) 0 to less than 0.05 weight percent of a catalyst selected from the group consisting of amines and ammonium compounds, phosphine and phosphonium compounds, aliphatic sulfonium and arsonium compounds and heterocyclic nitrogen-containing compounds, said catalyst present in the tackifier in amounts such that the catalyst does not promote a curing reaction between Components (a) and (b).

2. The tackified substrate of claim 1 wherein the tackifier becomes flowable and tacky at a temperature between about 40° C. and about 200° C.

3. The tackified substrate of claim 1 wherein the curing agent is a polyhydric phenol or phenolic resin.

4. The tackified substrate of claim 1 wherein the tackifier further contains a diglycidyl ether derivative of a halogenated bisphenol.

5. The tackified substrate of claim 1 wherein the curing agent is a polyphenol.

6. The tackified substrate of claim 1 wherein the tackifier contains:
   (1) about 30 to 50 weight percent epoxy resin derived from a phenol-hydrocarbon resin;
   (2) about 20 to 30 weight percent diglycidyl ether of a halogenated dihydric phenol; and
   (3) about 20 to 40 weight percent polyhydric phenol or phenolic resin.

* * * * *